US006594764B1

(12) United States Patent
Wishner et al.

(10) Patent No.: US 6,594,764 B1
(45) Date of Patent: Jul. 15, 2003

(54) APPARATUS, METHODS, AND COMPUTER PROGRAM PRODUCTS FOR NETWORK MANAGEMENT OPERATIONS RELATING TO NETWORK MANAGEMENT PROTOCOL ADAPTER SECURITY SOFTWARE (MPASS) FOR MESSAGING WITH USER NAME ACCESS IDENTIFICATION

(75) Inventors: Josie Anne Wishner, Seattle, WA (US); Balaji V. Pagadala, Sunnyvale, CA (US); Rajeev Angal, Santa Clara, CA (US); Subodh Bapat, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/330,521

(22) Filed: Jun. 11, 1999

(51) Int. Cl.[7] .................................................. G06F 9/00

(52) U.S. Cl. ....................... 713/202; 713/150; 713/153; 713/163; 713/168

(58) Field of Search ................................ 713/150, 153, 713/161, 163, 168, 182, 202

(56) References Cited

U.S. PATENT DOCUMENTS 5,699,513 A * 12/1997 Feigen et al. ............... 713/200

* cited by examiner

*Primary Examiner*—Thomas R. Peeso
(74) *Attorney, Agent, or Firm*—Meyertons Hood Kivlin Kowert & Goetzel, P.C.; B. Noël Kivlin; Rory D. Rankin

(57) ABSTRACT

A computer implemented method and a computer program product includes a first computer readable code construct configured to handle request messages. This comprises receiving a request message and having an associated user name which is associated with a remote user on a network. Further, making an access determination to determine whether the forwarding of the request message is authorized, and finally when forwarding of the request message is authorized, the message to a target system is forwarded.

22 Claims, 13 Drawing Sheets

| FIG. 6A | FIG. 6B |
|---|---|

APPARATUS, METHODS, AND COMPUTER PROGRAM PRODUCTS FOR NETWORK MANAGEMENT OPERATIONS RELATING TO NETWORK MANAGEMENT PROTOCOL ADAPTER SECURITY SOFTWARE (MPASS) FOR MESSAGING WITH USER NAME ACCESS IDENTIFICATION

CROSS REFERENCE TO RELATED PATENT APPLICATIONS

This patent application is related to other patent applications, filed herewith on the same day and entitled "Apparatus, Methods and Computer Program Products For Network Management Operations Relating To Network Management Protocol Security Software (MPASS) For Single and Multiple Users", Ser. No. 09/330,902, Secure User Association and Set-Up Using Network Management Protocol Security Software (MPASS)", Ser. No. 09/330,932.

"Independent Log Containment Hierarchy", Ser. No. 09/330,514, "Domain Access Control For Logging Systems", Ser. No. 09/332,270, and "Distinguished Name Scoping System For Event Filtering", Ser. No. 09/330,790. These related patent applications are hereby expressly referenced and incorporated herein in their entirety.

COPYRIGHTS IN PATENT MATERIALS

Portions of this patent document contain material subject to copyright restriction. The copyright owner has no objection to facsimile reproduction of the patent document after grant, as it appears in the U.S. Patent and Trademark Offices files or records, but otherwise reserves all rights relating thereto.

TECHNICAL FIELD

The field of this application relates to apparatus, methods, and computer program products relating to network management operations and particularly to apparatus, methods, and computer program products for network management protocol adapter security software.

BACKGROUND OF THE INVENTION

Currently, remote network management entities can gain access to local network management entity management information completely. This is particularly desired by enterprises which are leasing network bandwidth from carriers which have used large-scale network management frameworks to consolidate network management functions for all of the pieces of a leased network into a single platform. An enterprise wants visibility into the part of the network which it has leased. Carriers offer their customers visibility into the network management framework so that customers can see what is happening to the portion of the network they have leased. This is done by a network management system owned by the customer. This network management system communicates with the network management system owned by the carrier using a protocol such as Common Management Information Protocol (CMIP).

In particular, the customer asks for the status of managed objects owned by the customer. Both local and remote users of the network management system interact with the network management information as a set of objects. When a carrier's network management system receives commands from multiple customers A and B, each requesting visibility into a corresponding portion of the network, the carrier's network management system needs to ensure that customer A does not see customer B data and vice-versa. It is desirable to restrict such remote access to local network management information. A local user of a management system has its use of the management system and its features and objects restricted by native security features built into the network manager and the computer system itself. However, a remote network management application entity may not be specifically identifiable as a user-id on a host computer system. Accordingly, the local network manager may not be able to exploit the security features of the host computer system to restrict access.

It is further desirable that the view presented to a remote network manager of the local management information tree (MIT) be pruned to include only selected information items. It is technically difficult to implement such restrictions, limitations, and prohibitions. In particular, standard network management protocols, such as the Common Management Information Protocol (CMIP), set forth in International Telecommunication Union (ITU) Standard x.711), provide hooks to install proprietary authentication and authorization, but fail to include standardized authentication and authorization mechanisms.

SUMMARY OF THE INVENTION

A computer implemented method and a computer program product according to the present invention, includes a first computer readable code construct configured to handle request messages. This comprises receiving a request message and having an associated user name which is associated with a remote user on a network. Further according to the present invention, making an access determination to determine whether the forwarding of the request message is authorized, and finally when forwarding of the request message is authorized, the message to a target system is forwarded.

According to one embodiment of the present invention, a computer implemented method and a computer program product include a first computer readable code construct configured to handle request messages. This comprises receiving a request message and having an associated user name which is associated with a remote user on a network. Further, making an access determination to determine whether the forwarding of the request message is authorized, and finally when forwarding of the request message is authorized, the message to a target system is forwarded. The MPASS feature provides an open-system approach of agent role authorization and authentication that can be used in interactions with any other management system. According to the present invention, the management protocol adapter security software (MPASS) feature enables a network manager, acting in an agent role, to restrict access to its management information over CMIP communications, with respect to remote network management entities. MPASS allows a network manager to identify remote CMIP network management entities as specific users and to restrict their access to its management information. In particular, according to one embodiment of the present invention, an authentication/authorization mechanism is automatically enforced by a Solstice Enterprise Manager (SEM) framework when the local network management entity receives a remote request, to ensure that only appropriate, limited visibility is provided to peers and superior managers requesting local network management information.

Further, according to the present invention, when multiple users have access to a shared management system, the carrier's network management framework authenticates and assigns a user name to each MOM and peer manager who connects and provides access control over particular requests, so that each customer sees only the appropriate limited portion of the data stored in the network management framework which the customer is entitled to access. According to the present invention, access to features and objects of the network management system is restricted to particular remote users, who are either assigned a user-id, mapped from their network address and application-entity title, or is optionally assigned a fallback or default user-id.

According to one embodiment of the present invention, a remote user-id is assigned to the remote network management system, to enable the local system to identify its authorization scope.

According to another embodiment of the present invention, a remote user-id is assigned to the remote network management system based upon the remote entity network address and application title, to enable the local system to identify its authorization scope. The MPASS system, according to the present invention, restricts access to local management information by remote network management entities communicating over ITU x.711 CMIP using ITU x.227 ACSE (Association Control Service Element) connections, referred to as associations. The local management information is made available to a remote management entity in the entity's native network management protocol using management protocol adapters (MPAs) specific to the local manager. Each of the remote applications of the remote managers is identified by an MPA as a remote user with a specific network address and application-entity-title (AE-title), as described in ITU Standard x.650. An AE-title is a presentation layer address, added as a supplement to allow this layer to distinguish different applications that are active at the OSI layer 7, the application layer.

With an MPASS single user feature configured according to the present invention, a specified MPA is assigned a user-id. The MPA and assigned user-id are reserved for a single user, and the MPA restricts access to the management information allowed by that user's access permissions. With a multi-user feature of MPASS according to the present invention, a specified MPA is assigned zero or more user-ids mapped to the MPA network address and AE-title. With these user-ids, access is restricted by the local manager to only allow associations of specified users. Accordingly, the MPA only presents to a remote user the management information allowed by that remote user's access permissions.

DETAILED DESCRIPTION OF A PREFERRED MODE

Figure 1:
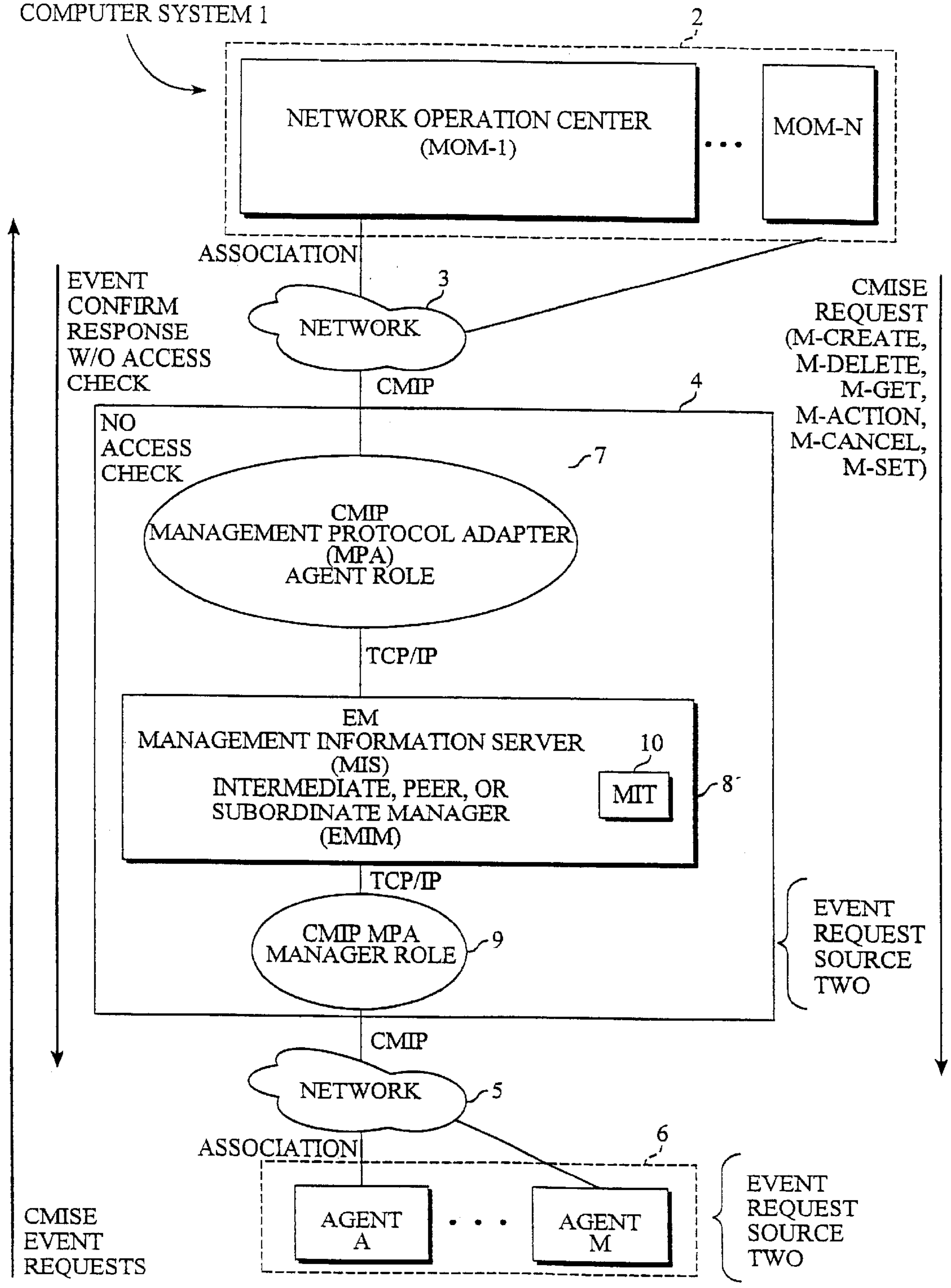
FIG. 1 is a block diagram of a computer system including a network operation center (NOC) superior manager, that is, a manager of managers (MOM)

Referring now to FIG. 1, there is shown a block diagram of a computer system 1 including one or more network operation center (NOC) managers of managers (MOM-1, MOM-2, . . . , MOM-N) 2. The computer system 1 further includes a first network system 3 connected to the one or more MOMs 2, an enterprise manager (EM) 4, a second network system 5, and one or more agents 6 such as agent A, . . . , agent M for example, according to the present invention. According to one embodiment of the present invention, the EM 4 includes a CMIP MPA agent 7, which optionally is assigned a fallback user id, an EM management information system (MIS) intermediate, peer, or subordinate manager (EMIM) 8 acting in a subordinate management role, and a CMIP MPA manager 9. The EMIM 8, in turn, includes a management information tree (MIT) 10 which has mapped into it as objects a multi-user access map (UAM) containing an access table of user-ids. A single user fallback user-id is directly mapped into the CMIP MPA from its environment variables or the command line.

The UAM is a branch of the MIT that stores user-ids and the network addresses of peer or superior managers. Each remote entity may have one entry in the UAM. A presentation layer address and an application-entity title form a key that is used by the CMIP MPA in an agent role to retrieve a specific user name from the UAM.

Figure 2:
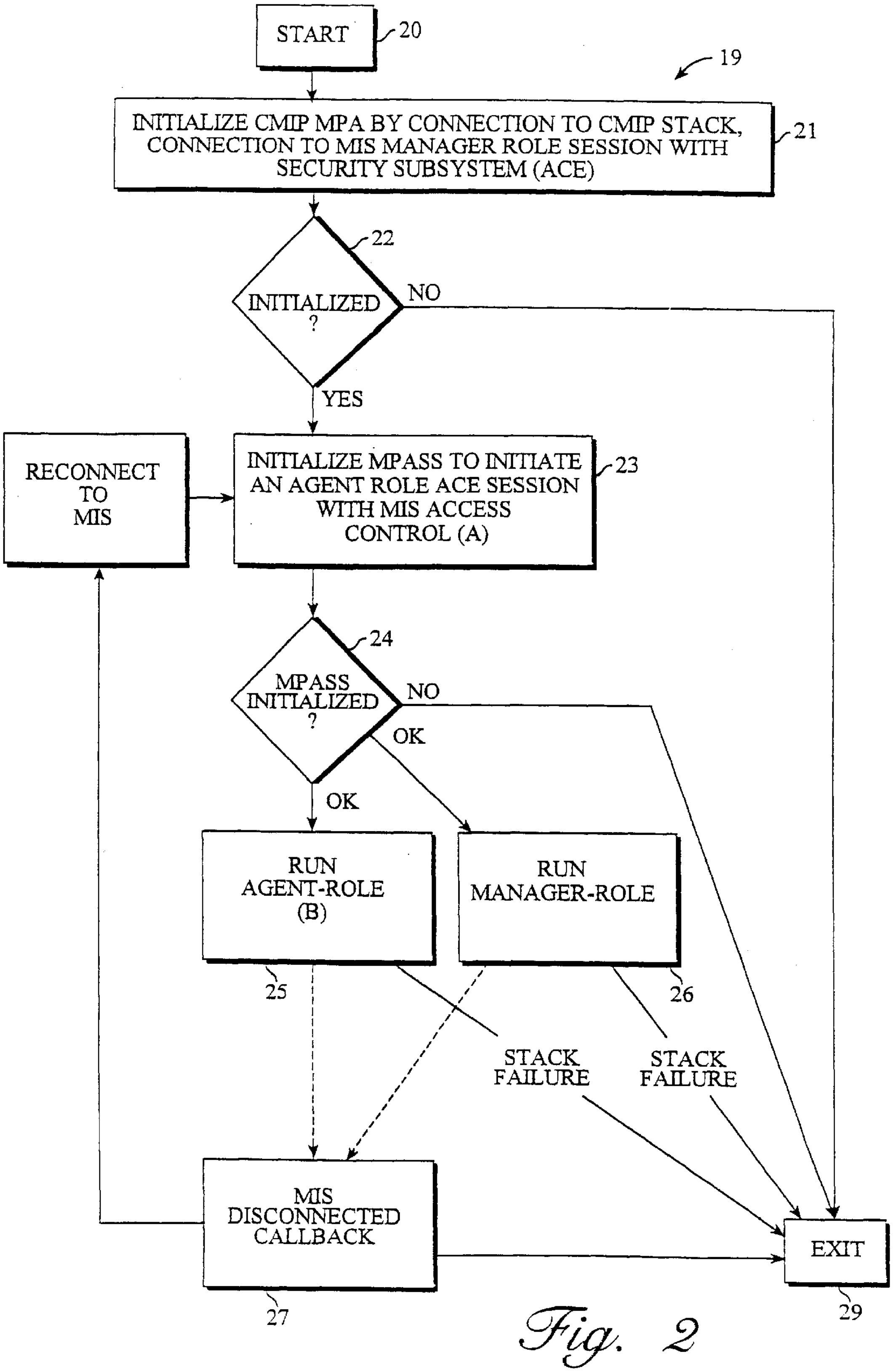
FIG. 2 is a flowchart of an MPASS method according to the present invention.

Referring now to FIG. 2, there is shown a top level flowchart of an MPASS method 19 according to the present invention. The MPASS method 19 begins 20 with session initialization of a connection with the CMIP stack (i.e., binding to the CMIP stack), followed by establishment of a connection to the MIS, and finally a session with the security subsystem, an access control engine (ACE). Once the session is initialized, the CMIP MPA 21 runs in first and second predetermined roles, including operation in an agent role and operation in a manager role, as discussed in greater detail below. In particular, the CMIP MPA 21 runs the agent role and the manager role logic in the loop of a finite state machine. Three primary error conditions that cause the CMIP MPA to exit the state machine and to terminate execution are: the detection of a non-recoverable error returned from the CMIP stack, the occurrence of internal error in the CMIP MPA 21, and the entry of the CMIP MPA 21 into a retry timeout loop in which it stays until successful reconnection to the MIS is accomplished. After the CMIP MPA 21 has been initialized with respect to an MIS connection, according to an initialization test 22, the MPASS agent role access control system is initialized 23 to initiate an ACE security session with the MIS. Once the MPASS access control system has been initialized 24, the EM performs in an agent role which is run 25, as discussed in detail herein.

Alternatively, the EM operates in a manager role which is run 26 according to a predetermined sequence and architecture. By callback, a check is armed continuously 27 to determine whether the MIS has been disconnected 27. If the MIS is disconnected, the agent role and the manager role of the EM are rerun 25. A stack check is armed continuously 28 to determine if a stack failure condition has occurred. If no stack failure or kill condition has been encountered in either the agent role or the manager role, the agent role of the EM experiences no changes If there has been such a failure or stack kill of the MIS, the EM exits and quits operation 29. In summary, the initialization of the CMIP MPA requires an MIS connection 30 to be completed.

Figure 3:
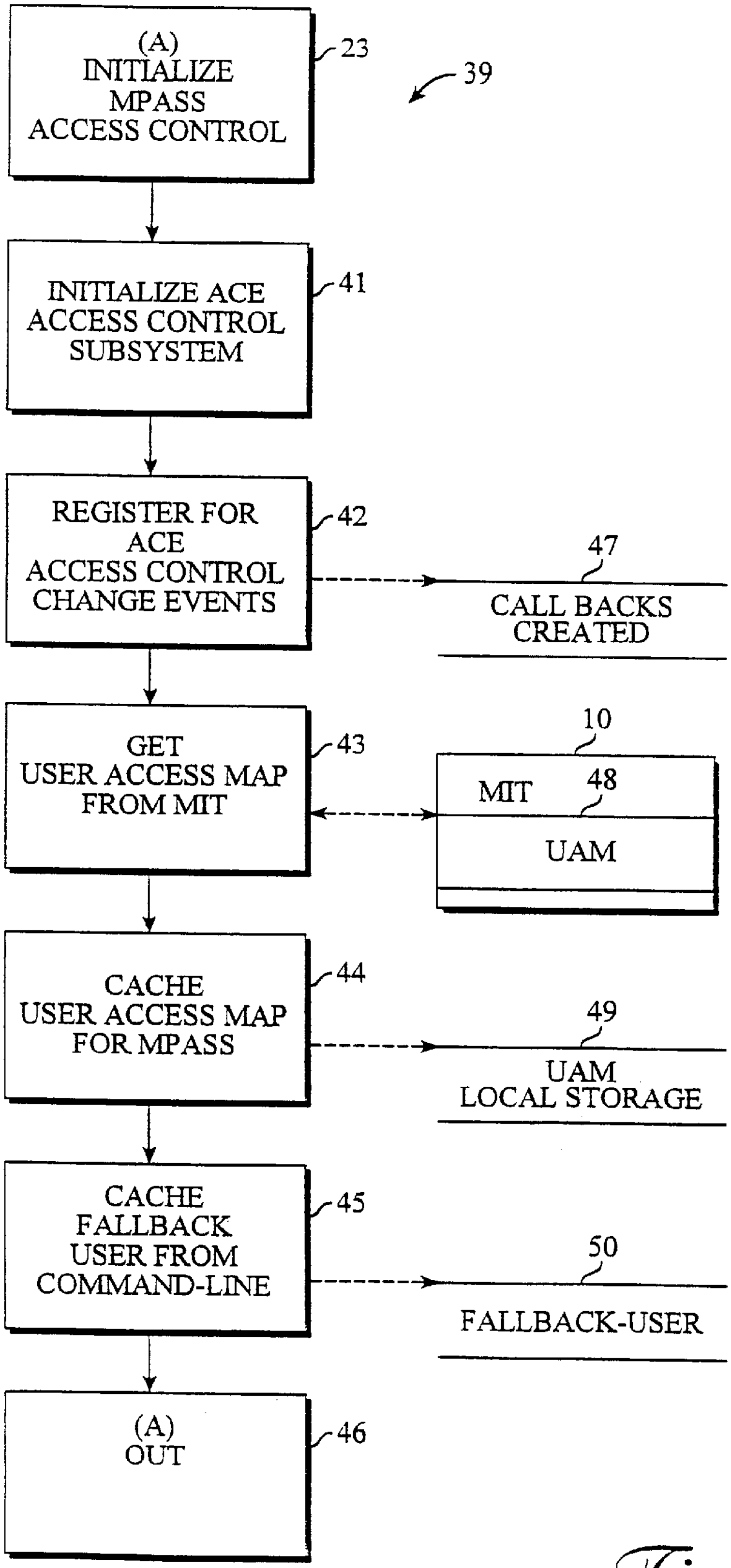
FIG. 3 is a flow chart of an MPASS access control initialization method according to one embodiment of the present invention.

Referring now to FIG. 3, there is shown an MPASS access control initialization method 39 for ensuring security to local management information, according to one embodiment of the present invention. The MPASS access control method 39 includes initializing an MPASS access control 23 subsystem, followed by initialization 41 of an access control engine (ACE) of the access control subsystem. Then, registration 42 is accomplished for predetermined ACE access control change events. Accordingly, callback functions are created 47 pursuant to registration of ACE access control change events. Then, a user access map (UAM) is obtained 43 from an MIT according to the present invention. This user access map is obtained from a UAM source 48 in the MIT, according to one embodiment of the present invention. Next, the UAM is cached 44 for use in MPASS. In particular, cacheing is implemented by local storage of the UAM 49. Thereafter, fallback user information is cached 45 from a command-line to a fallback-user memory location 50. Thereafter, an exit is taken 46 from the MPASS initialization access control routine 39 according to an embodiment of the present invention.

Figure 4:
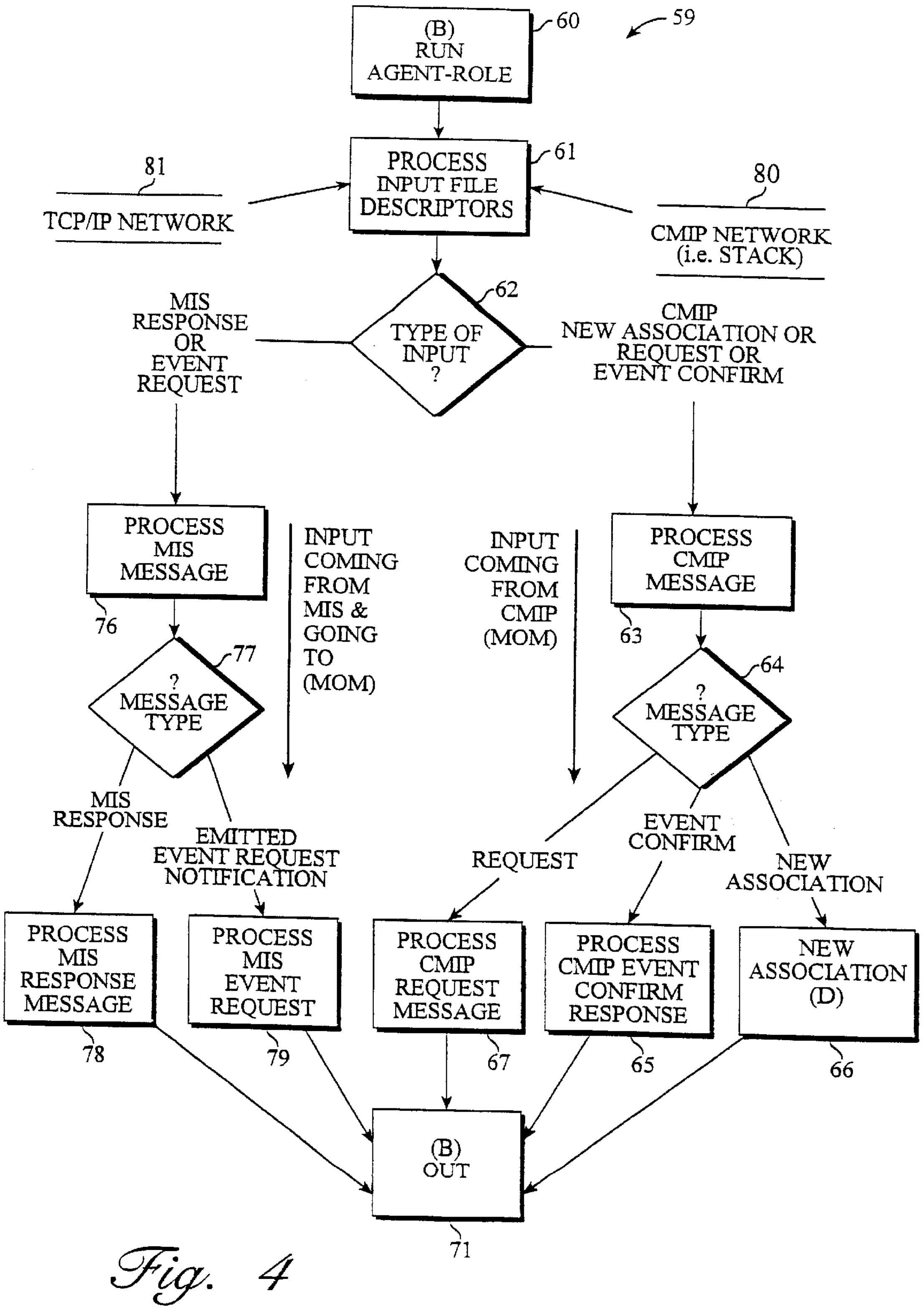
FIG. 4 is a flow chart of a method of run agent operation according to one embodiment of the present invention.

Referring now to FIG. 4, there is shown a method of run agent operation 59 for the EM, according to one embodiment of the present invention. The agent role of the EM has a run status 60 according to the present invention which includes processing 61 input file descriptors which are predetermined. In particular, an evaluation is made 62 as to the type of input received, i.e., either an input from the MIS or an input from the CMIP stack. The evaluation further is based upon MIS and CMIP file descriptors from a common management information service element (CMISE), or from an Association Control Service Element (ACSE) message or from a callback.

CMISE Message types according to one embodiment of the present invention include M-Event-Report, M-Get, M-Cancel-Get, M-Set, M-Action, M-Create, and M-Delete types of messages. These seven types of CMISE services provide many of the commands needed to transmit and process management information within the system. An M-Event-Report reports an event concerning a managed object to a CMISE service user and may be confirmed (or acknowledged) or unconfirmed. An M-Get message requests retrieval of management information from a peer CMISE service user and requires confirmation. An M-Cancel-Get message requests that a peer CMISE service user cancel a previously requested and currently outstanding request made using an M-Get message and requires confirmation. An M-Set message requests modification of management information by a peer CMISE service user and may be confirmed or unconfirmed. An M-Action message requests that a peer CMISE service user perform a specified action and may be confirmed or unconfirmed. An M-Create message requests that a peer CMISE service user create an instance of a managed object and requires confirmation. An M-Delete message requests that a peer CMISE service user deletes specified instances of managed objects and requires confirmation.

ACSE messages are exchanged for creating or leaving class associations (connections). The agent role CMIP MPA receives ACSE indications (requests) for initiation of a link or association, and the ACSE issues either an ACSE response (success), and ACSE abort (for abrupt termination) or an ACSE release (for an orderly termination).

An M-Event-Report message conveys management information applicable to a notification. The other six types of services convey information applicable to systems management and operations. The M-Get, M-Set, M-Action and M-Delete messages can specify operation on single or multiple objects. When multiple objects are specified, if the request is successful, one response is returned for each object. Linkage between multiple responses is provided by a linked identifier parameter, which appears in each response and confirm message.

In one instance of operation of the EM, a CMIP message is received and processed 63 upon reception from a CMIP network 80, based upon a new association, ACSE request indication, request or an event confirmation type of input. In at least one of such cases of receipt of a CMIP message, a determination of message type is made 64. Then, confirmation of receipt of the CMIP event is sent 65 to the MIS. Finally, the run agent role of the EM is completed 71.

According to another instance of operation of the run agent role of the CMIP MPA 7, a TCP/IP MIS message is received from an associated TCP/IP network 79 and the particular MIS message received is processed 76, according to a predetermined scheme, and a CMISE response or a CMISE event notification request. In particular, a determination is made as to message type 77, such as response, request, or notification. A response message is sent 78 to the CMIP stack without an access check, because the access check was already performed on the original request. An access check is conducted 67 with the MIS security mechanism, the ACE, in particular to authenticate access requests and notifications. The access check is either successful, indeterminate, or a failure. Where authorization of access is indeterminate, an event notification is discarded, and the operation is considered to be completed 71. When a CMIP request is received from a remote manager such as MOM-2 for local management information, an access check is performed with the MIS security system (ACE. The access check is successful, is indeterminate, or fails. For a request, if successful, the request is sent to the MIS. If the request access check is indeterminate, the request is sent to the MIS and receives additional security subsystem checks, before being processed. If the request access check is a failure, the request is discarded.

Figure 5:
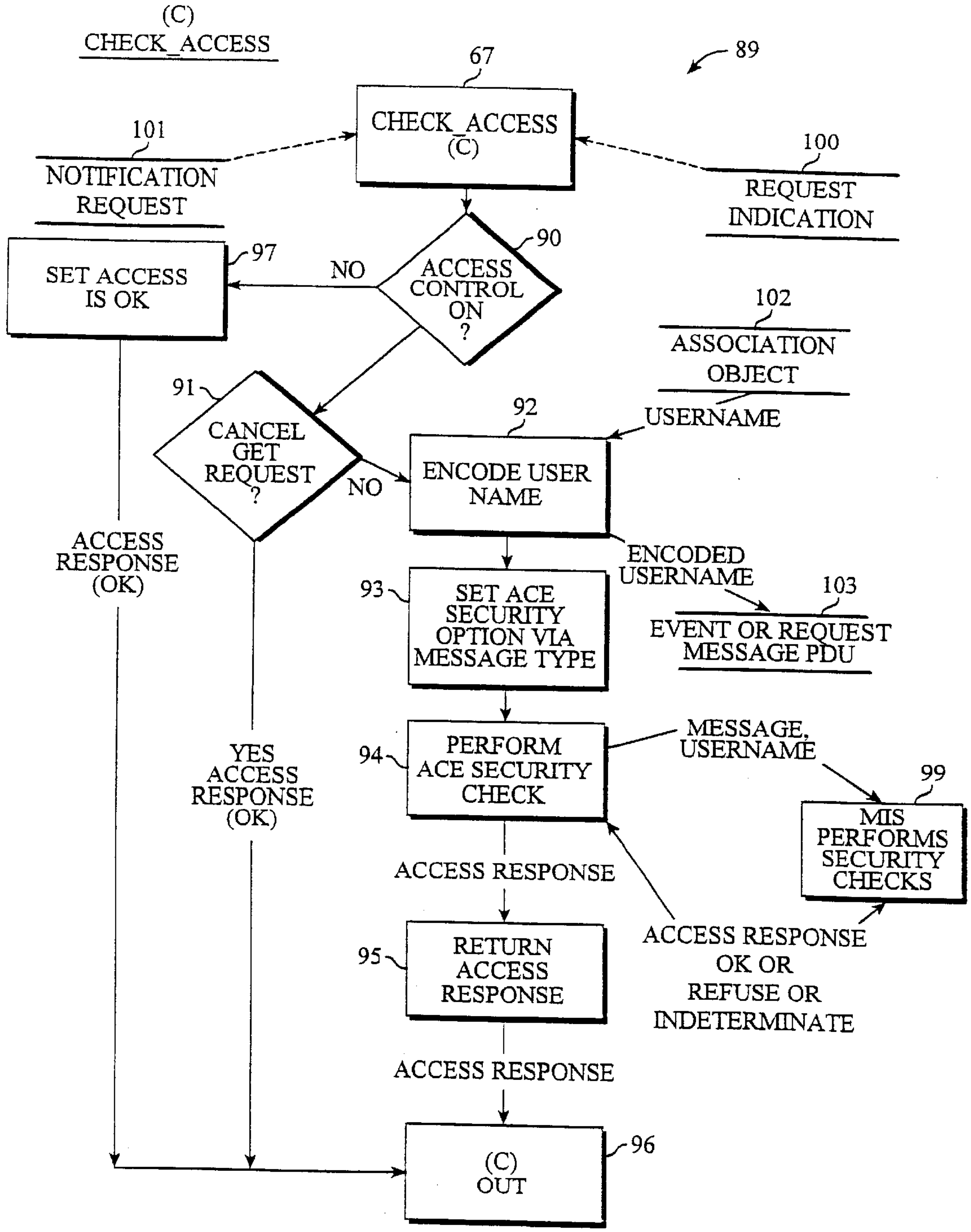
FIG. 5 is a flow chart of a check access method according to one embodiment of the present invention.

Referring now to FIG. 5, there is shown a check access method 89 according to one embodiment of the present invention. In particular at the beginning 67 of the check access method 89, a determination is made 90 of whether access control is in an on state or off state. If access control is off, no access check is performed, and the message is forwarded to its destination. If access is on, if the message type is an M-Cancel-Get message, the message is forwarded to the MIS without an access check. If the message type is one of an M-Event request type, or an M-Set request type, or an M-Action request type, or a M-Get request type, or an M-Delete type, or an M-Create type, the user name which was originally retrieved from the UAM or from the fallback user, and which is now stored in the association object, is encoded, added to the message and an ACE access check is performed. The access check response, one of success, indeterminate, and failure is returned.

Figures 6, 6A:
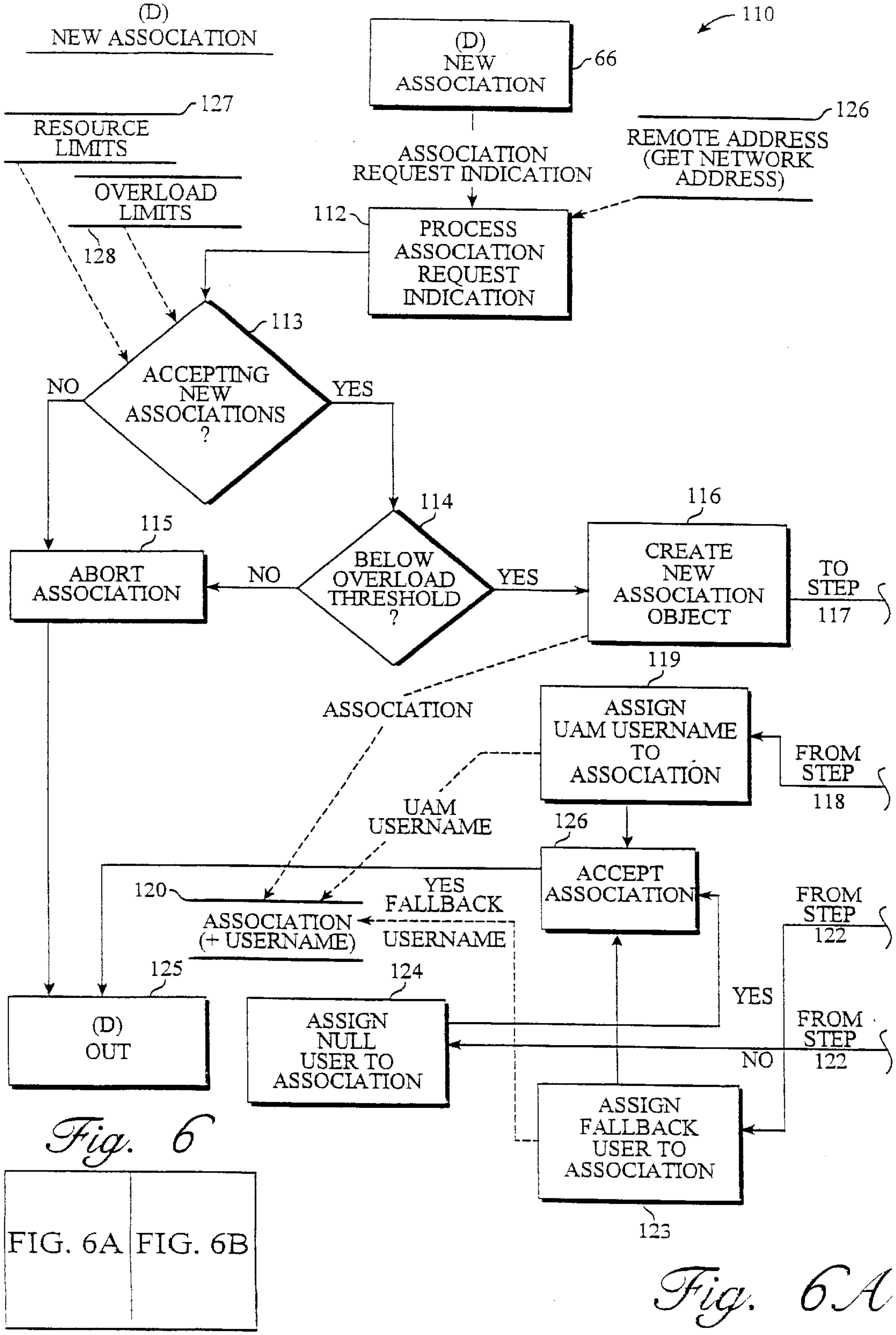
FIGS. 6A and 6B are a flow chart of a new association method according to one embodiment of the present invention.
Figure 6B:
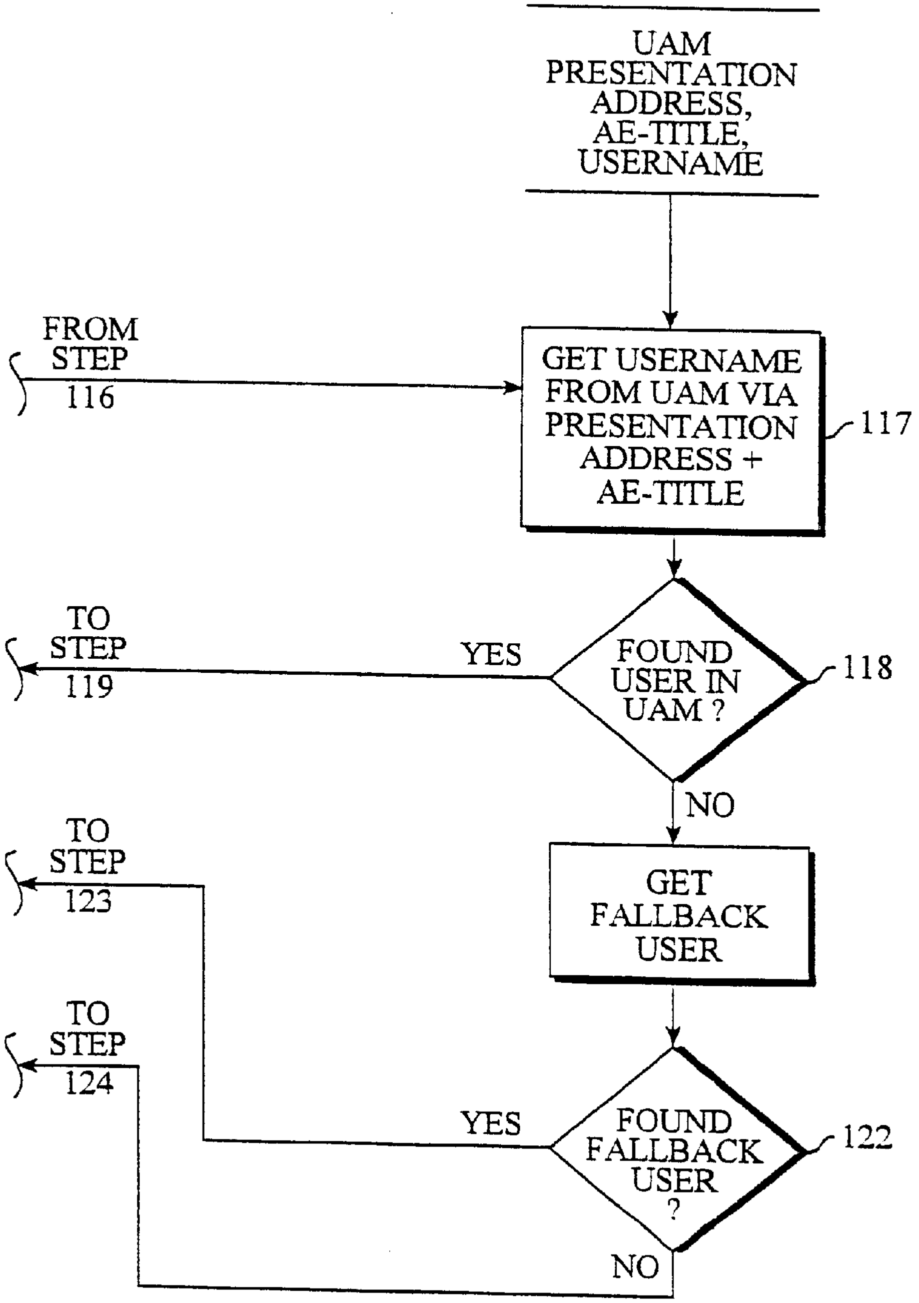

Referring now to FIGS. 6A and 6B, there is shown a new association method 110 according to one embodiment of the present invention. The new association begins 66 with processing of an association request (AARQ) 112 from a remote address 126 representing a remote management entity, subject to restrictions arising from resource limits 127 and certain overload limits 128. The resource and overload limit information is determined from current state variables within the CMIP MPA. Thereafter, a determination is made as to whether to accept a new association 113 with a remote manager, based upon the current resource or overload limits or conditions. If new associations are acceptable, a determination is made whether processing is below overload thresholds 114. If the answer is "yes" the processing is below overload conditions and a new association is created 116. If the processing would exceed overload conditions, the attempted association is aborted 115. Thus, operation is completed 125, according to one path.

To create a new association 116 if the overload threshold has not been exceeded, a username is obtained 117 from the UAM 11 using the remote presentation address and AE-title of MOM as a key. Portions of the presentation address or the AE-title may hence be used as a pattern match to locate a specific user-id. If the username is found 118 in the UAM 11, the particular UAM username which is found is assigned to the association 119. Then, an association accept response message (AARE) is sent 126. Otherwise, if the user is not found to be present in the UAM 11, the fallback user is established 121, and a determination is made whether the fallback user has been found 122. If the answer is "yes", the fallback user has been found, that fallback user name which has been determined is assigned 123 to the association which has been accepted. Then, an accept response message (AARE) is sent 126. Otherwise, if no fallback user has been found, a null user is assigned as a default, according to one embodiment of the present invention. Then, an AARE is sent 126, followed by completion of new association operation 125. The system allows acceptance of the association in this case, because it is possible that an appropriate user-id might be assigned in the UAM or fallback user object at a later time.

Figure 7:
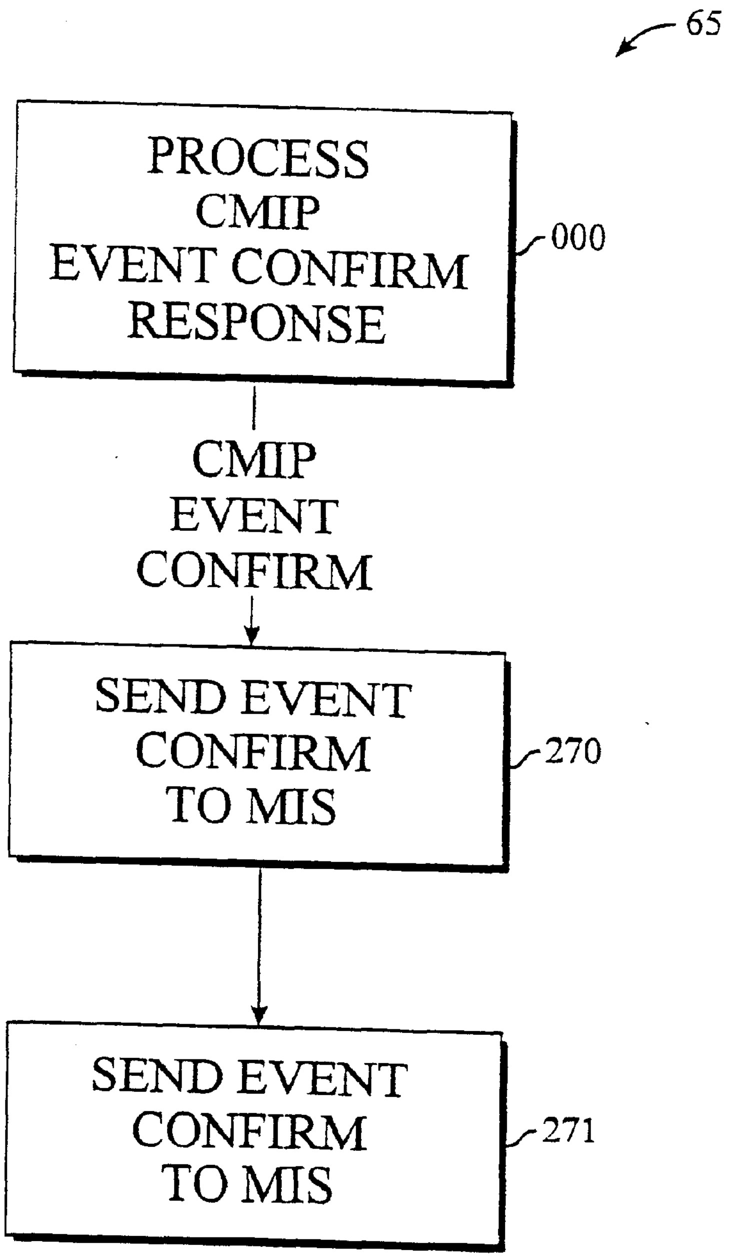
FIG. 7 is a flow chart according to the present invention of a method of processing CMIP event confirm response messages.

Referring now to FIG. 7, there is shown a flow chart according to the present invention of a method 65 of processing CMIP event confirm response messages. In particular, according to the method 65, a CMIP event confirm response is processed by receipt of a CMIP event confimation response 269 and then an event confirmation is sent to the MIS 270, followed by an exit from CMIP event confirm response processing.

Figure 8:
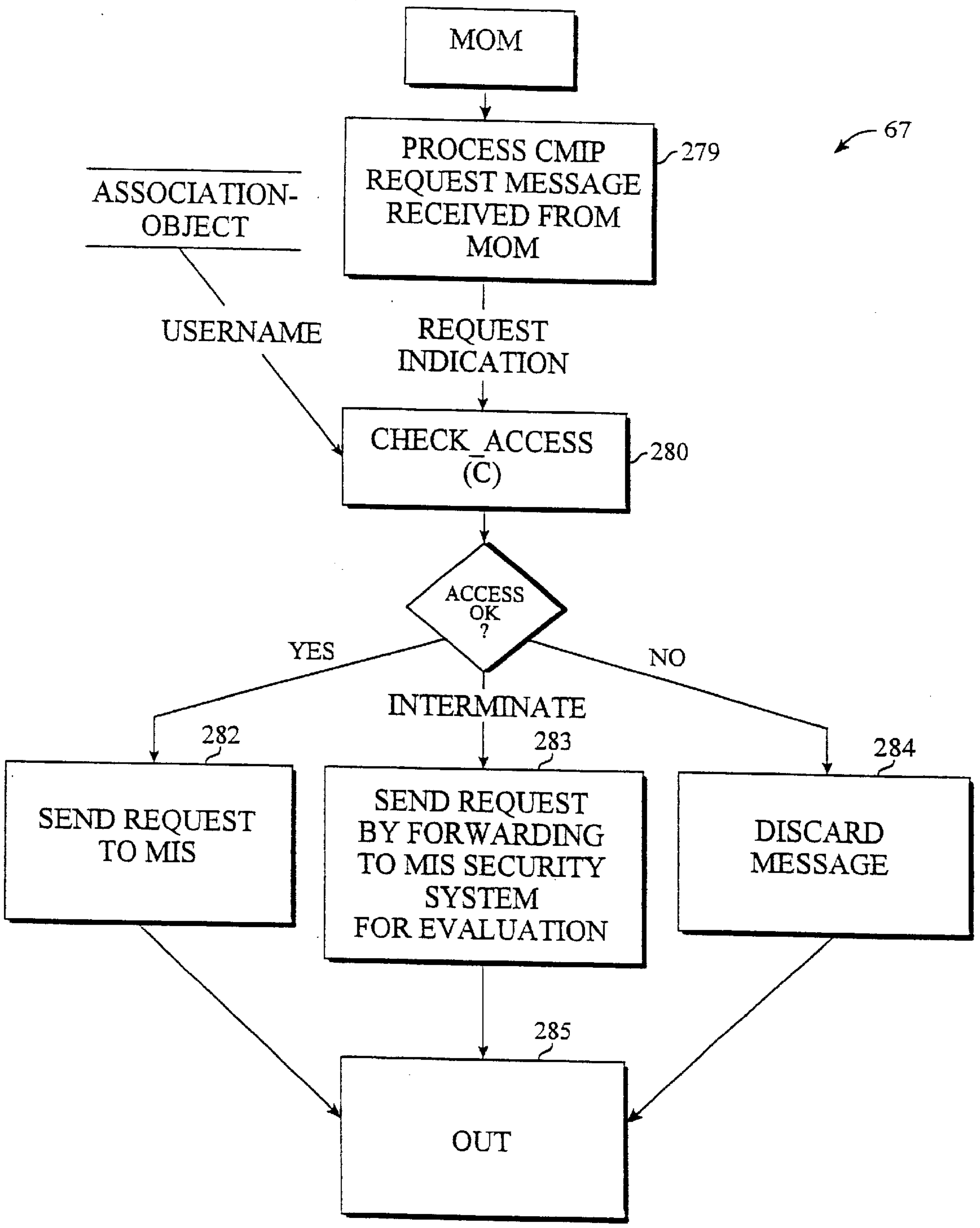
FIG. 8 is a flow chart according to the present invention of a method of processing CMIP request messages.

Referring now to FIG. 8, there is shown a flow chart according to the present invention of a method 67 of processing CMIP request messages. According to the method 67, a CMIP request message is processed 279 by receipt of a request indication followed by implementation of check access processing 280 based upon receipt of a username from an association object. Then a determination is made as to whether access rights are granted or not to enable handling of the CMIP request. If access rights are granted, the request is sent 282 to the MIS. If access rights are not granted, the message is discarded 284. If the result of the access check is indeterminate, a request is sent 283 to the MIS security system for evaluation, followed by an exit 285 from CMIP request message.

Figure 9:
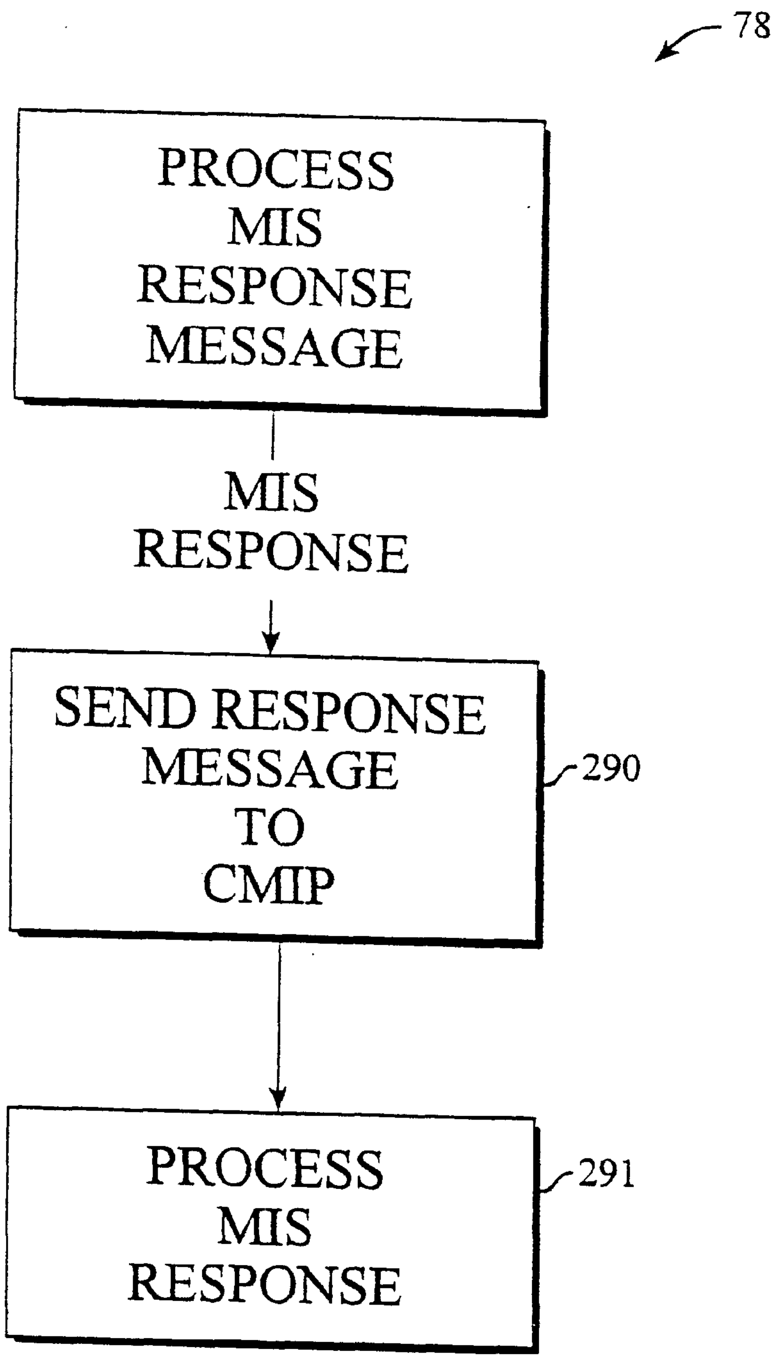
FIG. 9 is a flow chart according to the present invention of a method of processing MIS response messages.

Referring now to FIG. 9, there is shown a flow chart according to the present invention of a method 78 of processing MIS response messages. In particular, according to the method 78, an MIS response message is processed after receipt of the message, followed by an exit from CMIP event confirm response processing.

Figure 10:
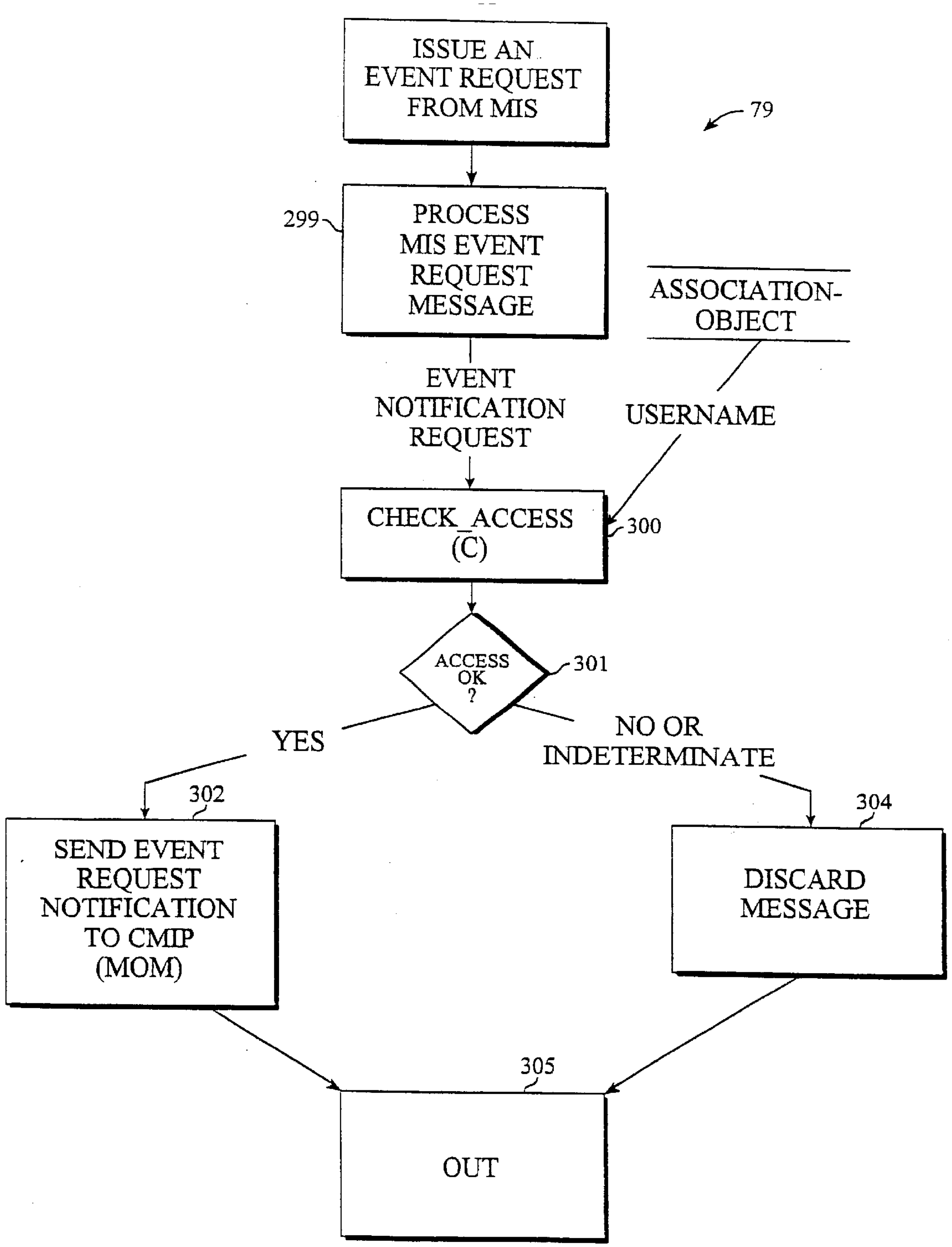
FIG. 10 is a flow chart according to the present invention of a method of processing CMIP event request messages.

Referring now to FIG. 10, there is shown a flow chart according to the present invention of a method of processing CMIP event request messages. According to the method 79, a CMIP request message is processed 299 by receipt of an event notification request, followed by implementation of check access processing 300 based upon receipt of a username from an association object. Then a determination is made 301 whether access rights are granted or not to enable handling of the CMIP event request. If access rights are granted, the event notification is sent 302 to the CMIP. If access rights are not granted or are indeterminate, the message is discarded 304.

Figure 11:
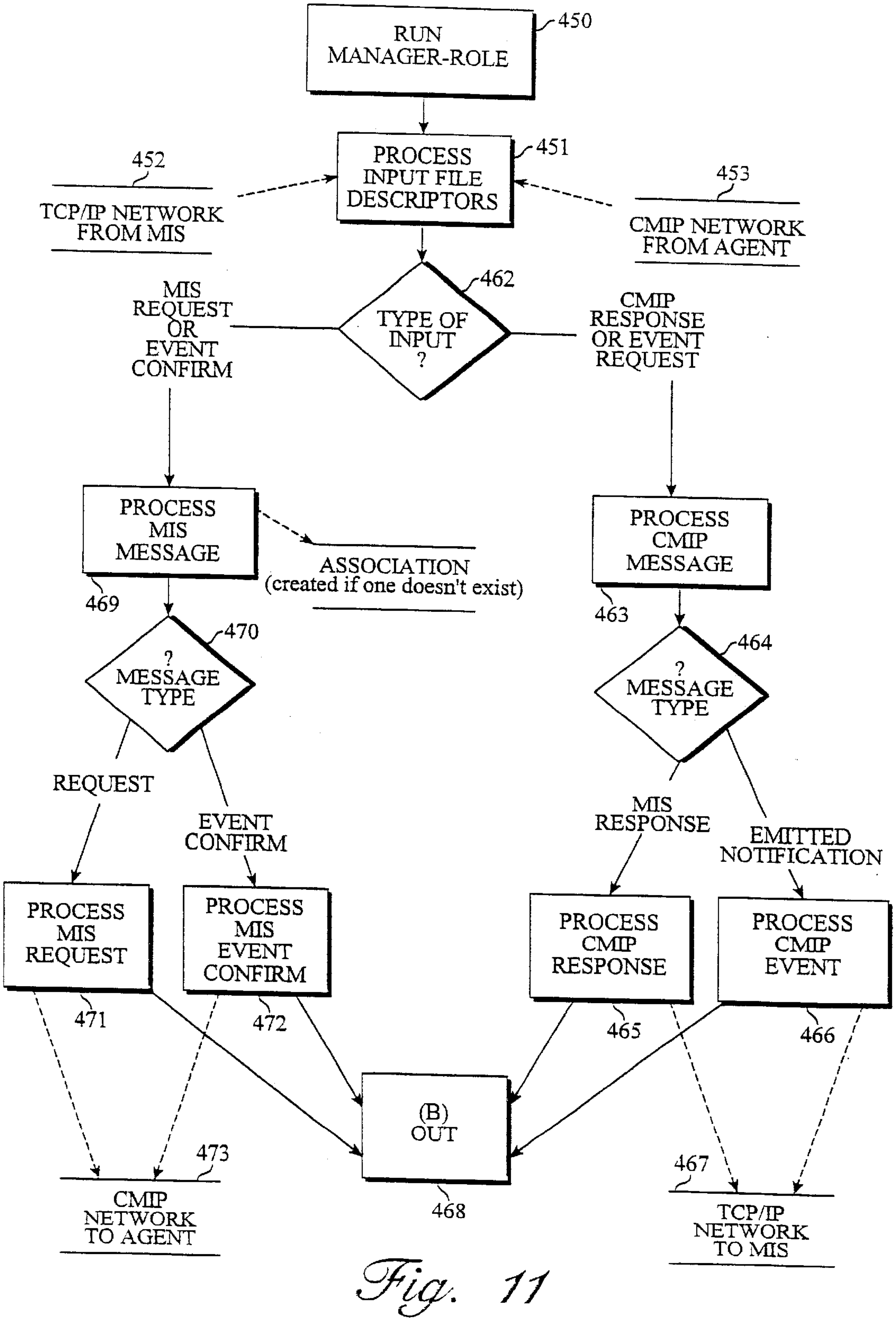
FIG. 11 is a flow chart of a method of run manager operation according to one embodiment of the present invention.

Referring now to FIG. 11, there is shown a flow chart of a method 450 of manager role operation according to one embodiment of the present invention. The management role of the EM has a run status, according to the present invention, which includes processing 451 input file descriptors which are received 452 over the TCP/IP network from the MIS or over the CMIP network 453 from an agent. In particular, an evaluation is made 462 as to the type of input received, i.e., either an input from the MIS or an input from the CMIP stack. The evaluation further is based upon MIS and CMIP file descriptors from a CMISE message or from a callback. Message types according to one embodiment of the present invention include M-Event-Report, M-Cancel-Get, M-Get, M-Set, M-Action, M-Create, and M-Delete types of messages. In one instance of operation of the EM, a CMIP message is received and processed 463 upon reception from a CMIP network 453. In at least one case of receipt of a CMIP message, a determination of message type is made 464. Then, confirmation of receipt of the CMIP event is sent 465 to the MIS Finally, the run management role of the EM is completed 468.

According to another instance of operation of the run management role of the CMIP MPA 7, a TCP/IP MIS message is received from an MIS associated TCP/IP network 452, the particular MIS message received is processed, according to a predetermined scheme, and a CMISE request or a CMISE event notification confirmation response is processed. In particular, a determination is made as to message type 469, e.g., request or event confirmation. A response message is sent to the CMIP stack without an access check, because the access check was already performed on the original request. An access check is conducted with the MIS security mechanism (ACE) to perform access checks for requests and notifications. The access check either proves to be successful, is indeterminate, or is a failure. In the event of access authorization being indeterminate, an event notification is discarded and the operation is considered to be completed. When a CMIP request is received from a remote manager such as MOM-2 for local management information, an access check is performed with the MIS security system (ACE. The access check is one of success, indeterminacy, or failure. If a request access check is successful, the request is sent to the MIS. If the request access check is indeterminate, the request is sent to the MIS and receives additional security subsystem checks before being processed. If the request is a failure, the request is discarded.

Figure 12:
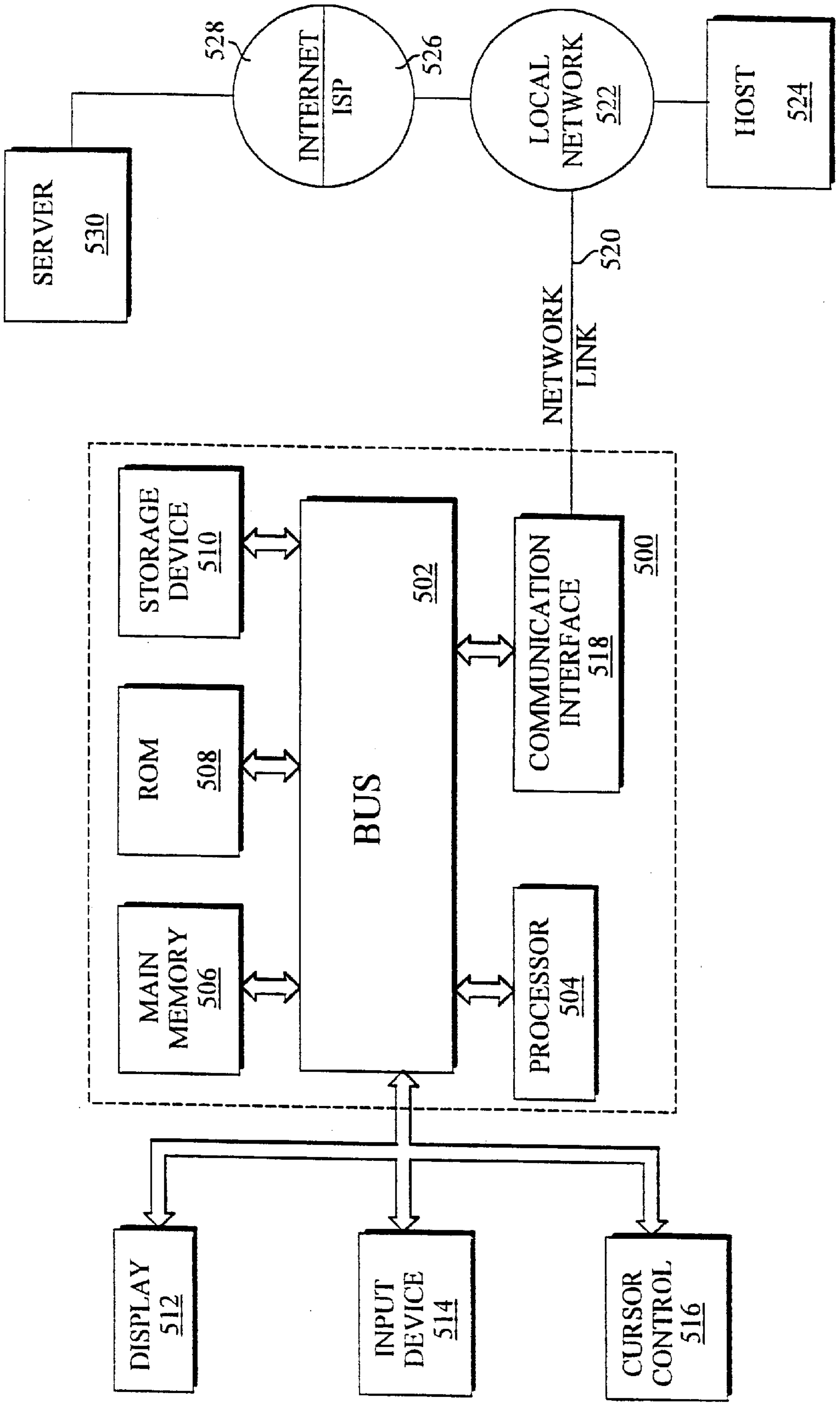
FIG. 12 is a block diagram of a computer system which may be used to implement the present invention.

FIG. 12 shows a block diagram of a general computer system 500 which may be used to implement various components of the present invention. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 505 or other static storage device coupled to bus 502 for storing static information and instructions for processor 504. A storage device 510, such as a magnetic disk or optical disk, is provided and coupled to bus 502 for storing information and instructions. Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. According to an embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software. The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 104. Computer system 500 also includes a communication interface 515 coupled to bus 502. Communication interface 515 provides a two-way data communication coupling to a network link 520 that is connected to a local network 522. For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information. Network link 520 typically provides data communication through one or more networks to other data devices. For example, network link 120 may provide a connection through local network 522 to a host computer 524 or to data equipment operated by an Internet Service Provider (ISP) 526. ISP 526 in turn provides data communication services through the world wide packet data communication network now commonly referred to as the "Internet" 525. Local network 522 and Internet 525 both use electrical, electromagnetic or optical signals that carry digital data streams. The signals through the various networks and the signals on network link 520 and through communication interface 515, which carry the digital data to and from computer system 500, are exemplary forms of carrier waves transporting the information. Computer system 500 can send messages and receive data, including program code, through the network(s), network link 520 and communication interface 515. In the Internet example, a server 530 might transmit a requested code for an application program through Internet 525, ISP 526, local network 522 and communication interface 515. The received code may be executed by processor 504 as it is received, and/or stored in storage device 510, or other non-volatile storage for later execution.

In summary, according to the present invention, a computer-implemented method for network management operates in a computer system including a local network manager and at least one remote network manager (e.g., a remote user). A method according to the present invention includes, without limitation, receiving a request for management information from a remote network manager, and restricting access to management information in response to a request made by a remote network manager. A method of the present invention includes implementing communications between local and remote network managers using CMIP and processing a request by a remote network manager for local network management information, with the local network manager restricting access to the local management information. According to one embodiment of the present invention, access is restricted using a management protocol adapter security software (MPASS) feature. The method begins with initiation of communications between a local network manager a remote network manager. The remote network manager requests local network management information. The MPASS features enables a local network manager to act in an agent role to restrict access to its management information over CMIP communications with respect to a remote network manager. In particular, MPASS allows a network manager to identify particular remote CMIP network management entities as specific users and to restrict their access to its management information according to a predetermined scheme.

The method according to another embodiment of the present invention includes enforcing an authentication or authorization mechanism automatically with an SEM framework. In particular, when the local network manager receives a remote network manager request, limited visibility is provided for the particular remote manager to ensure that only appropriate information is provided to the remote network manager. A local network manager is used, according to the present invention, to authenticate each remote network manager that connects, through a look-up table in the UAM, if possible, or use of a fallback user-id or null user-id. This provides access control over particular requests for local management information. Accordingly, each remote network managers sees only an appropriate limited portion of the local management information which is stored in a local network MIT, which each remote network manager is entitled to access.

In particular, the method of the present invention includes restricting access to features and objects of a local network manager to particular remote network managers. In particular, a user identifier (user-id) is assigned to each said remote network manager. The remote user-id is assigned to a remote network manager arbitrarily, according to one embodiment. This enables the local network manager to identify the authorization scope of particular remote network managers.

Further, according to the present invention, a remote user-id is assigned to zero or more remote network managers based upon particular associated network addresses and application titles. This enables the local network manager to identify the authorization scope of particular remote network managers that request information. Further, according to one embodiment of the present invention, the MPASS feature restricts access to local management information by remote network managers that communicate over ITU x.711 CMIP. More particularly, the network managers use ITU x.227 ACSE connections, referred to as associations.

According to one embodiment of the present invention, local network management information is available to remote network managers in their native network management protocol. To accomplish this result, an MPA specific to the local network manager is employed. According to one embodiment of the present invention, identifying remote applications of remote network managers is accomplished with an MPA. A remote user is thus provided with a specific network address and an AE-title (as described in ITU Standard x.650). Further, the method according to the present invention uses an MPASS single-user feature in which a specified MPA is assigned a particular user-id. With this user-id, the MPA is reserved for a single user. Further, the MPA then restricts access to local network management information according to that particular user's access permissions. According to a multi-user feature of MPASS, assignment is made of a specified MPA with zero or more user-ids, which are mapped from associated network addresses and application-entity titles as keys.

Further according to the present invention, a computer program product is embodied in a computer usable medium having a computer readable code means embodied therein. The computer program product is used for managing remote network manager requests for local network manager information. The computer program product particularly comprises a first computer readable code construct (CRCC) configured to receive a request for management information from a remote network manager. The computer program product further comprises a second CRCC configured to restrict access to management information in response to a request made by a remote network manager.

What is claimed is:

1. A computer program product embodied in a computer usable medium having a computer readable code means embodied therein, the computer program product comprising:

a first computer readable code means configured to receive a message, having an associated user name, from a remote user on a network;

a second computer readable code means configured to make an access determination to determine whether a response to the message is authorized;

a third computer readable code means configured to deliver the message to a management information system, referred to as an MIS, when forwarding of a request message is authorized; and a fourth computer readable code means configured to allow the MIS to analyze the message and to prepare and forwarding a response message to the remote user.

2. The computer program product according to claim 1, wherein at least one of said first, second, third and fourth code means is configured to discard said message when forwarding of the request message is not authorized.

3. The computer program product according to claim 1, wherein at least one of said first, second, third and fourth code means is configured to make said access determination by:

determining if an access control protocol is activated;

when the access control protocol is not activated, indicating that forwarding the request message is authorized;

when the access control protocol is activated, determining what is the type of said message when the message type is an M-Cancel-Get request, indicating that forwarding of the request message is authorized; and when the message type is an M-Event request, an M-Set request, an M-Action request, an M-Get request, an M-Create request or an M-Delete request, performing an access check on said user name, and determining if the access check is successful, is indeterminate, or is unsuccessful.

4. The computer program product according to claim 3, wherein at least one of said first, second, third and fourth code means is configured to authorize forwarding a request message when said access check on said user name is successful.

5. The computer program product according to claim 4, wherein at least one of said first, second, third and fourth code means is configured to discard said message when said access check is not successful.

6. The computer program product according to claim 5, wherein at least one of said first, second, third and fourth code means is configured to perform at least one additional security check on said user name when said access check is indeterminate.

7. The computer program product according to claim 6, wherein at least one of said first, second, third and fourth code means is configured to authorize a response to said message when said access check is indeterminate and said at least one additional security check is successful.

8. A method of handling event request notifications, comprising:

determining if a peer or superior management entity (i.e., a MOM) is authorized to receive an event request; and forwarding the event request to the MOM.

9. The method according to claim 8 wherein the event request is received from the MIS.

10. The method according to claim 8 wherein the event request is received from an agent subordinate to said MIS.

11. A method of handling request messages, comprising:

receiving a request for a new association from a remote network;

creating a first new association in response to determining new associations are being accepted;

accessing a predetermined user access map in order to obtain a username corresponding to said request, wherein said map is accessed using a presentation address and application entity title corresponding to said request;

assigning a first username obtained from said map to said first new association in response to detecting said first username corresponding to said presentation address and application entity title is present in said map; and assigning a fallback username to said first new association in response to detecting said first username is not present in said map and said fallback username is present in said map.

12. The method according to claim 11, further assigning a null user to said first new association, in response to detecting said first username is not present in said map and said fallback username is not present in said map.

13. The method according to claim 11, further comprising receiving an request message from a manager of managers, said request message corresponding to said first new association.

14. The method according to claim 13, further comprising:

performing an access check on said request message, wherein said access check is based upon a received user name corresponding to said first new association;

sending said request message to a target management information server in response to determining access rights for said request message are granted;

forwarding said request message to a security system of the management information server in response to determining said access rights are indeterminate; and discarding said request message in response to determining said access rights are not granted.

15. The method according to claim 14, wherein said access check comprises:

forwarding said message request to said management information server if said message request is a first type of message; and performing an ACE access check on said message request if said message request is a second type of message.

16. The method according to claim 15, wherein said first type of message is an M-Cancel-Get message type, and wherein said second type of message is selected from the group consisting of: M-Event request type, M-Set request type, M-Action request type, a M-Get request type, M-Delete type, and M-Create type.

17. A system for handling messages, comprising a computer that is configured to:

receive a request for a new association from a remote network;

create a first new association in response to determining new associations are being accepted;

access a predetermined user access map in order to obtain a username corresponding to said request, wherein said map is accessed using a presentation address and application entity title corresponding to said request;

assign a first username obtained from said map to said first new association in response to detecting said first username corresponding to said presentation address and application entity title is present in said map; and assign a fallback username to said first new association in response to detecting said first usemame is not present in said map and said fallback username is present in said map.

18. The system according to claim 17, wherein said computer is further configured to assign a null user to said first new association, in response to detecting said first username is not present in said map and said fallback username is not present in said map.

19. The system according to claim 17, wherein said computer is further configured to receive n request message from a manager of managers, said request message corresponding to said first new association.

20. The system according to claim 19, wherein said computer is further configured to:

perform an access check on said request message, wherein said access check is based upon a received user name corresponding to said first new association;

send said request message to a target management information server in response to determining access rights for said request message are granted;

forward said request message to a security system of the management information server in response to determining said access rights are indeterminate; and discard said request message in response to determining said access rights are not granted.

21. The system according to claim 20, wherein said access check comprises:

forwarding said message request to said management information server if said message request is a first type of message; and performing an ACE access check on said message request if said message request is a second type of message.

22. The system according to claim 21, wherein said first type of message is an M-Cancel-Get message type, and wherein said second type of message is selected from the group consisting of: M-Event request type, M-Set request type, M-Action request type, a M-Get request type, M-Delete type, and M-Create type.

* * * * *